United States Patent
Wiest et al.

(10) Patent No.: US 11,035,708 B2
(45) Date of Patent: Jun. 15, 2021

(54) CLAMP-ON ULTRASONIC SENSOR HAVING COUPLING ELEMENT ADAPTED FOR RESPECTIVE MEASURING TUBE

(71) Applicant: Endress+Hauser Flowtec AG, Reinach (CH)

(72) Inventors: Achim Wiest, Weil am Rhein (DE); Sascha Grunwald, Steinen (DE)

(73) Assignee: Endress+Hauser Flowtec AG, Reinach (CH)

( * ) Notice: Subject to any disclaimer, the term of this patent is extended or adjusted under 35 U.S.C. 154(b) by 186 days.

(21) Appl. No.: 16/343,110

(22) PCT Filed: Sep. 11, 2017

(86) PCT No.: PCT/EP2017/072754
§ 371 (c)(1),
(2) Date: Apr. 18, 2019

(87) PCT Pub. No.: WO2018/072926
PCT Pub. Date: Apr. 26, 2018

(65) Prior Publication Data
US 2019/0257679 A1    Aug. 22, 2019

(30) Foreign Application Priority Data
Oct. 19, 2016   (DE) ...................... 10 2016 119 910.9

(51) Int. Cl.
*G01F 1/66*    (2006.01)
*G01F 1/00*    (2006.01)
*G01F 15/00*   (2006.01)

(52) U.S. Cl.
CPC .............. *G01F 1/663* (2013.01); *G01F 1/002* (2013.01); *G01F 1/662* (2013.01); *G01F 1/667* (2013.01);
(Continued)

(58) Field of Classification Search
None
See application file for complete search history.

(56) References Cited

U.S. PATENT DOCUMENTS

| | | |
|---|---|---|
| 4,735,097 A | 4/1988 | Lynnworth |
| 6,065,350 A | 5/2000 | Hill et al. |

(Continued)

FOREIGN PATENT DOCUMENTS

| | | |
|---|---|---|
| CN | 101883967 A | 11/2010 |
| CN | 104870949 A | 9/2013 |

(Continued)

OTHER PUBLICATIONS

Xuedong Xu, Principles and Applications of Control of Material Forming Process, Wuhan University Press, Feb. 28, 2016, pp. 135-141.

(Continued)

*Primary Examiner* — Harshad R Patel
(74) *Attorney, Agent, or Firm* — Christopher R. Powers; Endress+Hauser (USA) Holding Inc.

(57) ABSTRACT

The present disclosure relates to a clamp-on ultrasonic sensor for an ultrasonic flow rate measuring device and to an ultrasonic flow rate measuring device comprising at least one clamp-on ultrasonic sensor according to the present disclosure. The clamp-on ultrasonic sensor is designed to generate at least one lamb wave mode in a measuring tube wall of a measuring tube of the ultrasonic flow rate measuring device. To ensure the use of the clamp-on ultrasonic sensor on different types of measuring tubes, the clamp-on ultrasonic sensor comprises a coupling element, which coupling element is adapted to a respective type of measuring tube.

19 Claims, 6 Drawing Sheets

(52) U.S. Cl.
CPC .. *G01F 15/007* (2013.01); *G01N 2291/02836* (2013.01)

(56) References Cited

U.S. PATENT DOCUMENTS

| | | | |
|---|---|---|---|
| 6,575,043 B1 | 6/2003 | Huang et al. | |
| 6,715,366 B2* | 4/2004 | Ohnishi | G01F 1/662 |
| | | | 73/861.27 |
| 2006/0020404 A1 | 1/2006 | Kishiro et al. | |
| 2006/0278015 A1* | 12/2006 | Wiest | G01F 15/02 |
| | | | 73/861.18 |
| 2008/0060448 A1* | 3/2008 | Wiest | G01P 5/24 |
| | | | 73/861.27 |
| 2010/0257940 A1* | 10/2010 | Berger | G01F 1/662 |
| | | | 73/861.27 |
| 2011/0023623 A1* | 2/2011 | Berberig | G01F 1/662 |
| | | | 73/861.25 |

FOREIGN PATENT DOCUMENTS

| | | |
|---|---|---|
| CN | 103842779 A | 6/2014 |
| DE | 102006000693 A1 | 7/2007 |
| EP | 1235056 A2 | 8/2002 |
| EP | 2770305 A1 | 8/2014 |
| GB | 2363455 A | 12/2001 |
| JP | 6128821 A | 2/1986 |
| JP | 2002318144 A | 10/2002 |
| JP | 2010060386 A | 3/2010 |
| WO | 0245074 A1 | 6/2002 |

OTHER PUBLICATIONS

Search Report for German Patent Application No. 10 2016 119 910.9, German Patent Office, dated Jul. 31, 2017, 8 pp.
International Search Report for Patent Application No. PCT/EP2017/072754, WIPO, dated Nov. 10, 2017, 15 pp.
Li, Ming-wei, Wang, Fang, Zhang, Bo, Research on Lamb-wave emissive technology of wide-beam ultrasonic flowmeter, Journal of Dalian University of Technology, vol. 44, No. 4 (English language abstract included).

\* cited by examiner

CLAMP-ON ULTRASONIC SENSOR HAVING COUPLING ELEMENT ADAPTED FOR RESPECTIVE MEASURING TUBE

CROSS-REFERENCE TO RELATED APPLICATIONS

The present application is related to and claims the priority benefit of German Patent Application No. 10 2016 119 910.9, filed on Oct. 19, 2016, and International Patent Application No. PCT/EP2017/072754 filed on Sep. 11, 2017, the entire contents of which are incorporated herein by reference.

TECHNICAL FIELD

The invention relates to a clamp-on ultrasonic sensor for use in an ultrasonic flow-rate measuring device for measuring the flow rate or the volumetric flow rate of media in a measuring tube, wherein the clamp-on ultrasonic sensor is designed to generate and detect Lamb wave modes in a measuring tube wall, wherein the Lamb wave modes cause ultrasonic signals to be emitted into the measuring tube and wherein the Lamb wave modes are caused by ultrasonic signals passing through the measuring tube and arriving at the measuring tube wall.

BACKGROUND

The generation and detection of Lamb wave modes is already prior art, as shown for example in U.S. Pat. No. 6,575,043B1 and U.S. Pat. No. 4,735,097 A.

However, the efficiency of generation of the Lamb wave modes by a clamp-on ultrasonic sensor in a measuring tube wall depends on the wavelength or the wavelength range of an ultrasonic signal generated by the clamp-on ultrasonic sensor, on the geometric and material properties of the measuring tube, and on the geometric configuration of a contact region between measuring tube and clamp-on ultrasonic transducer. As a result, clamp-on ultrasonic sensors which are designed to generate Lamb wave modes in the measuring tube wall cannot be used without qualifications in all of the various measuring tubes. Each type of measuring tube requires a specially adapted clamp-on ultrasonic sensor to make a high level of efficiency possible.

SUMMARY

The object of the invention is therefore to propose an efficiently coupling clamp-on ultrasonic sensor which can be used in a particularly flexible manner on different measuring tube types.

The invention resides in a clamp-on ultrasonic sensor according to the present disclosure and in ultrasonic flow-rate measuring devices according to the present disclosure.

The clamp-on ultrasonic sensor according to the invention for use in an ultrasonic flow-rate measuring device for measuring the flow rate or the volumetric flow rate of media in a measuring tube comprises:
at least one transducer element for generating and/or detecting ultrasonic signals;
at least one acoustic transmitter designed to transmit the ultrasonic signals between a measuring tube wall and transducer element such that an ultrasonic signal is formed in the measuring tube wall as at least one Lamb wave mode,
wherein an ultrasonic signal is formed in the measuring tube wall as at least one Lamb wave mode,
wherein the acoustic transducer has a geometric structure on a side facing the measuring tube which is designed to convert an ultrasonic signal in the transmitter into an ultrasonic signal in the measuring tube wall, and/or convert an ultrasonic signal in the measuring tube wall into an ultrasonic signal in the transmitter,
wherein the acoustic transmitter has at least one ultrasonic signal conductor and at least one coupling element,
wherein the ultrasonic signal conductor and the coupling element are detachably mechanically connected,
and wherein the ultrasonic signal conductor is acoustically coupled to the transducer element,
and wherein the coupling element has the geometric structure and is designed to be acoustically coupled to the measuring tube.

The transducer element is thus replaceable; the clamp-on ultrasonic sensor can be adapted for use on different measuring tubes and for measuring the flow rate or the volumetric flow rate of media of different acoustic impedances and thus of different sound velocities.

In an embodiment of the clamp-on ultrasonic sensor, the clamp-on ultrasonic sensor further comprises a housing having at least one housing chamber, in which housing chamber the transducer element is arranged.

In an embodiment of the clamp-on ultrasonic sensor, the clamp-on ultrasonic sensor further comprises a holding device which is set up to releasably fasten the housing or the transducer element to the measuring tube.

In an embodiment of the clamp-on ultrasonic sensor, the geometric structure has at least two projections, wherein, in the direction of a measuring tube axis, adjacent projections are at a distance from each other, which distance with respect to the wavelength range of the ultrasonic signals and/or with respect to the measuring tube geometry and/or the material properties of the measuring tube is optimized for improving the coupling properties of the coupling element. A Lamb wave mode in the measuring tube wall is characterized by spatially distributed oscillation maxima and oscillation minima of the measuring tube wall. For optimal excitation of a Lamb wave mode, the distances between the projections must correspond to the distances between the oscillation maxima.

In an embodiment of the clamp-on ultrasonic sensor, the coupling element has a base area and a height, wherein the square of the height is less than 10% of the base area, wherein the square of the height is in particular less than 5% of the base area, and wherein the square of the height is in particular less than 2% of the base area. The coupling element is thus substantially disk-shaped. The base area is given by the maximum orthogonal projection of the coupling element onto a plane; the height is given by the maximum extension perpendicular thereto.

In an embodiment of the clamp-on ultrasonic sensor, the contact region between the geometric structure and the measuring tube substantially follows a straight line. This follows from the fact that a contact surface of the coupling element which is flat except for the recesses rests on the cylindrical lateral surface of the measuring tube.

In an embodiment of the clamp-on ultrasonic sensor, a layer having an adapted transfer function for the ultrasonic signal is in each case arranged between the coupling element and the measuring tube and/or between the coupling element and the ultrasonic signal conductor and/or between the transducer element and the ultrasonic signal conductor. By impedance matching, for example, the layer can increase the transmission of an ultrasonic signal between the elements concerned.

In one embodiment of the clamp-on ultrasonic sensor, the coupling element can be aligned on the housing and/or on the holding device. For example, the coupling element can have at least one groove into which a lug of the housing or the holding device engages.

In one embodiment of the clamp-on ultrasonic sensor, the housing can be aligned on the holding device. This can be done via a groove and a lug, or via an elastic latching mechanism.

In one embodiment of the clamp-on ultrasonic sensor, generating the at least one Lamb wave mode in the measuring tube wall causes an ultrasonic signal to be emitted into the measuring tube, wherein the emission has at least one preferred emission direction, which emission direction forms an angle ($\beta$) of less than 90°, and in particular less than 70°, and preferably less than 60° with respect to the measuring tube axis.

In one embodiment of the clamp-on ultrasonic sensor, the coupling element is attachable and replaceable on the ultrasonic signal conductor; and wherein an attachment comprises at least one element from the following list:

Velcro connection, releasable adhesive connection, wing nuts with screw connection, snap-in connection, knurled nut with screw connection, clamped connection, grease connection or silicone film based on adhesion force, magnetic connection.

The use of the clamp-on ultrasonic sensor on different measuring tube types is made possible by a simple interchangeability of the coupling element since only one coupling element adapted to the respective measuring tube type has to be selected and inserted into the clamp-on ultrasonic sensor.

In one embodiment of the clamp-on ultrasonic sensor, at least one element from the following list can be sealed against tampering:

acoustic transmitter, transducer element, housing, holding device.

An ultrasonic flow-rate measuring device according to the invention for measuring the flow rate or the volumetric flow rate of media in a measuring tube according to the propagation time difference measuring principle comprises a measuring tube having a measuring tube axis;
two clamp-on ultrasonic sensors according to the invention after at least one of them is arranged on the measuring tube; and measuring/operating electronics designed to operate the clamp-on ultrasonic sensors.

In an embodiment of the ultrasonic flow-rate measuring device, a first clamp-on ultrasonic sensor is arranged offset from a second clamp-on ultrasonic sensor along a measuring tube axis,
wherein, in a first/second region of the measuring tube wall, generating the at least one Lamb wave mode in the measuring tube wall causes an ultrasonic signal to be emitted into the measuring tube via the first/second clamp-on ultrasonic sensor, wherein the emission has at least one preferred emission direction,
wherein a first emission direction of the first region is directed at the second region, and wherein a first emission direction of the second region is directed at the first region, wherein a signal path between the first region and the second region has at least one measuring tube traverse.

An ultrasonic flow rate measuring device according to the invention for measuring the flow rate or the volumetric flow rate of media in a measuring tube on the Doppler measuring principle comprises a measuring tube with a measuring tube axis;
at least one clamp-on ultrasonic sensor according to the invention which is arranged on the measuring tube;
measuring/operating electronics designed to operate the clamp-on ultrasonic sensor,
wherein, in a third region of the measuring tube wall, generating the at least one Lamb wave mode in the measuring tube wall causes an ultrasonic signal to be emitted into the measuring tube via the clamp-on ultrasonic sensor, wherein the emission has at least one preferred emission direction.

A clamp-on ultrasonic sensor according to the invention usually has two emission directions which are arranged substantially symmetrically with respect to a line running perpendicular to the measuring tube axis. In the ultrasonic flow-rate measuring devices according to the invention, which operate according to the propagation time or propagation time difference principle, only the ultrasonic signals of an emission direction of a clamp-on ultrasonic sensor are used for flow measurement.

BRIEF DESCRIPTION OF THE DRAWING

The invention will be explained below with reference to exemplary embodiments.

DETAILED DESCRIPTION

Figure 1:
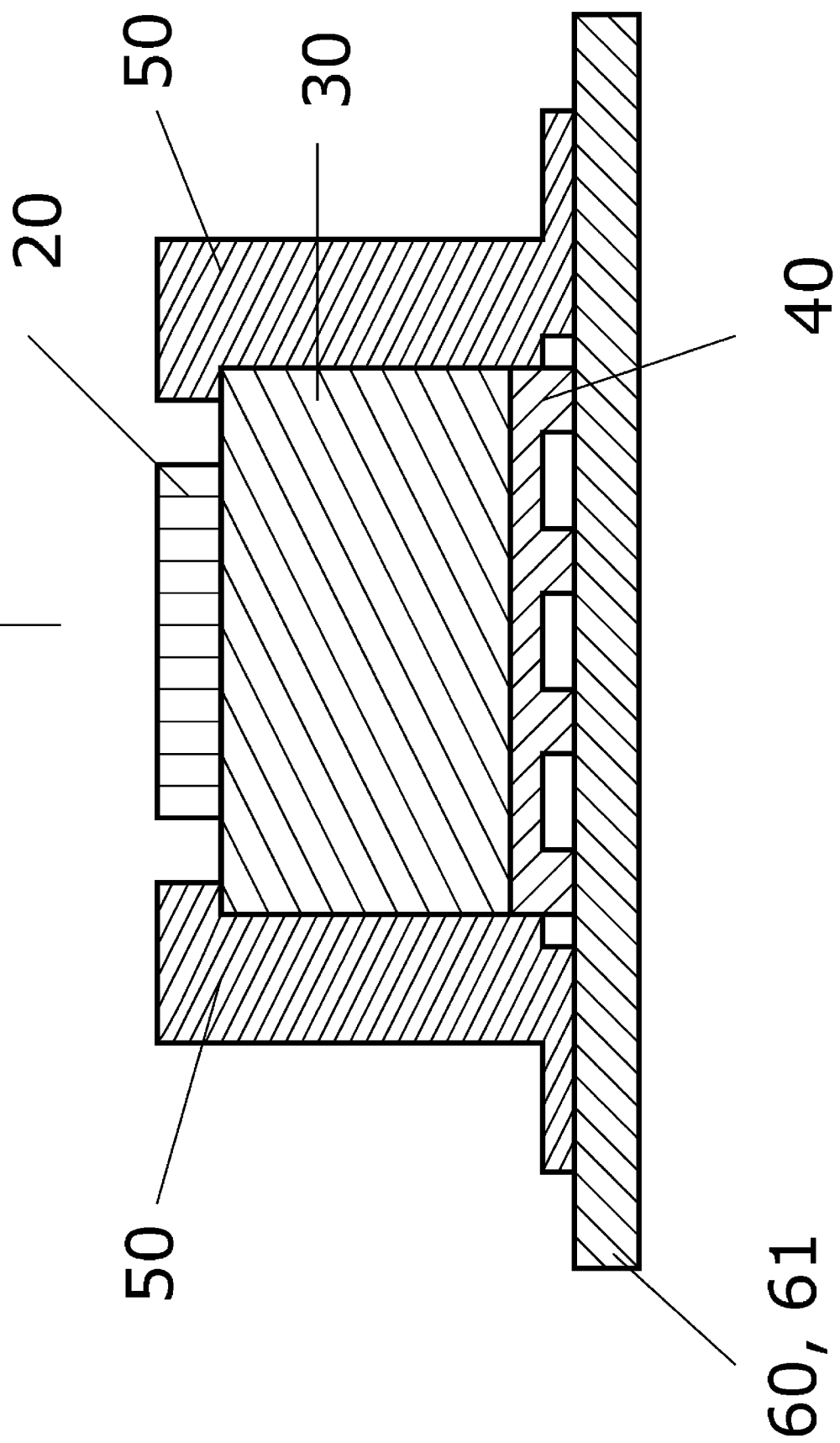
FIG. 1 shows a cross-section through an exemplary embodiment of a clamp-on ultrasonic sensor according to the invention.

FIG. 1 shows a cross-section through a clamp-on ultrasonic sensor 10 according to the invention comprising a transducer element 20, an ultrasonic signal conductor 30, a coupling element 40 and a holding device 50, wherein the holding device 50 is designed to fasten the transducer element, the ultrasonic signal conductor and the coupling element to a measuring tube wall 61 of a measuring tube 60. The transducer element is designed to convert between electrical signals and ultrasonic signals. The transducer element can be, for example, a piezoelectric element. An ultrasonic signal generated by the transducer element is coupled into the ultrasonic signal conductor 30 and passes to the coupling element 40 where it forms at least one Lamb wave mode in the measuring tube wall via a coupling element—measuring tube wall boundary by means of the coupling element, which Lamb wave mode causes the ultrasonic signal to be emitted into the measuring tube 60. Conversely, a Lamb wave mode generated by an ultrasonic signal passing through the measuring tube is coupled into the ultrasonic signal conductor via the coupling element, which ultrasonic signal conductor 30 conducts the ultrasonic signal to the transducer element 20, which transducer element converts the ultrasonic signal into an electrical signal. The holding device 50 may have a flange in contact with the measuring tube wall, for example, so that the clamp-on ultrasonic transducer can be fastened to the measuring tube by means of a clamping strap which is laid around the measuring tube 60. The coupling element 40 and/or the ultrasonic signal conductor 30 may each have at least one groove (not shown), so that the coupling element or the ultrasonic signal conductor can be aligned to the holding device via at least one nose (not shown).

Figure 2:
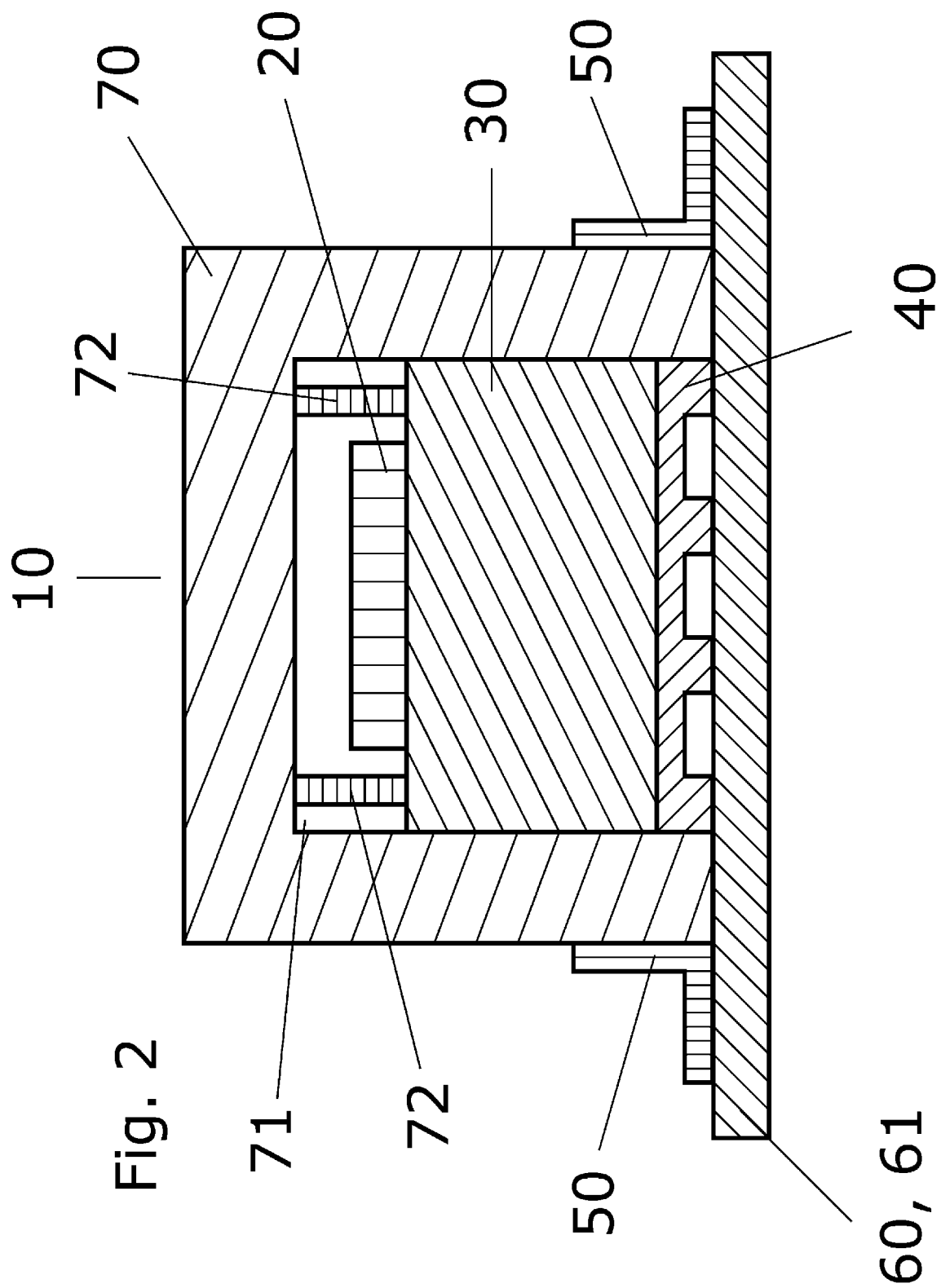
FIG. 2 shows a cross-section through an exemplary embodiment of a clamp-on ultrasonic sensor according to the invention.

FIG. 2 shows a cross-section through a clamp-on ultrasonic sensor 10 according to the invention, wherein the clamp-on ultrasonic sensor plus the clamp-on ultrasonic sensor 10 shown in FIG. 1 has a housing 70 with a housing chamber 71 in which housing chamber 71 the transducer element 20, the ultrasonic signal conductor 30 and the coupling element 40 are arranged and are completely shielded from the surrounding area by the housing 70, so that electrical interfering signals from the surrounding area have no influence on the ultrasonic sensor 10. In contrast to the clamp-on ultrasonic sensor shown in FIG. 1, the housing in this case may have at least one lug (not shown) via which lug the coupling element 40 and/or the ultrasonic signal conductor 30 are alignable via a groove (not shown). As shown in FIG. 2, a spring mechanism 72 may be designed to push the ultrasonic signal conductor 30 and the coupling element 40 opposite the housing 70 against the measuring tube wall 61. The ultrasonic signal conductor 30 shown in FIG. 1 and FIG. 2 can be made of a metal, a plastic or a ceramic.

Figure 3:
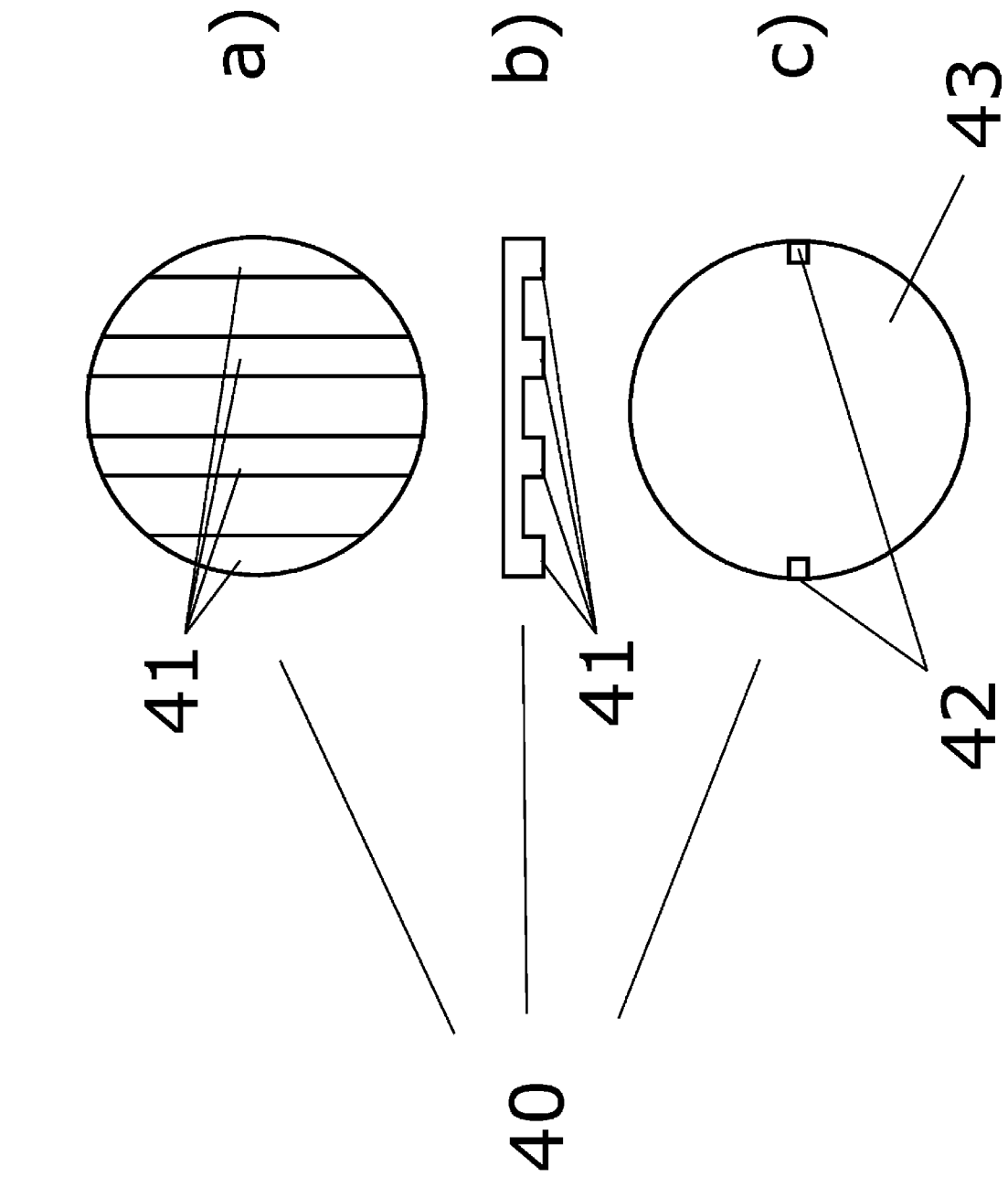
FIG. 3 shows three views of an exemplary embodiment of a coupling element 40 according to the invention, wherein FIG. 3a) shows a top view of a geometric structure of the coupling element 40, wherein FIG. 3b) shows a side view of the coupling element, and wherein FIG. 3c) shows a plan view of a side opposite the geometric structure shown in FIG. 3a).

FIG. 3 shows three views of a coupling element 40 according to the invention, wherein FIG. 3*a*) shows a top view of projections 41 of a geometric structure, and wherein FIG. 3*b*) shows a side view of the coupling element 40, and wherein FIG. 3*c*) shows a top view of a side 43 of the coupling element opposite the projections 41, which side 43 is acoustically coupled to the ultrasonic signal conductor. Engagement means 42 by which the coupling element can be aligned using at least one complementary engagement means of the housing 70 or of the holding device 50 can be introduced into the side 43. The widths of the projections 41 along a measuring tube axis and their distances to each other along the measuring tube axis are adapted to measuring tube properties such as diameter, wall thickness or material properties, so that an efficient transfer of the ultrasonic signal between coupling element 40 and measuring tube wall 61 is ensured in a working wavelength range of the clamp-on ultrasonic sensor. The spacings of the projections ideally correspond to the distances between oscillation maxima of a Lamb wave mode in the measuring tube wall 61 or whole-number multiples of the distances. Here the coupling element can be made of a metal, a plastic or a ceramic.

Figure 4:
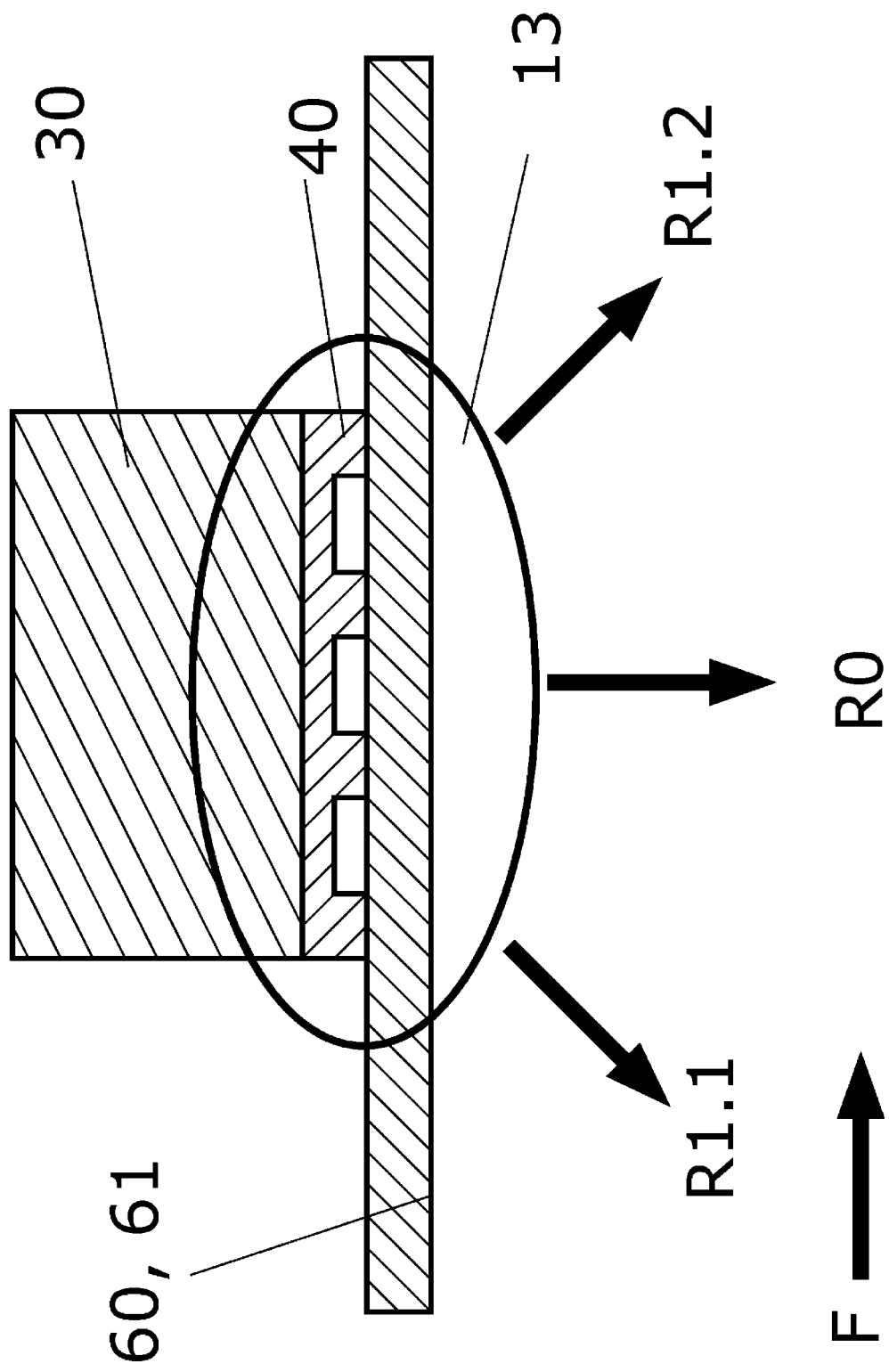
FIG. 4 shows in schematic form the emission of an ultrasonic signal into the measuring tube.

FIG. 4 outlines in schematic form the emission of the ultrasonic signal into the measuring tube 60, wherein at least one Lamb wave mode is formed or excited in a first region 13 of the measuring tube wall by the coupling element 40. The excitation of a Lamb wave mode at at least two locations provides for an emission of the ultrasonic signal into a main emission direction R0 perpendicular to the measuring tube wall and in at least two first-order secondary emission directions R1.1 and R1.2 arranged symmetrically with respect to the main emission direction. Depending on the acoustic impedance of the medium and of the measuring tube, further secondary emission directions of higher orders also occur (not in the diagram) in a similar fashion to the diffraction of a laser beam on an optical grating. The use of an ultrasonic signal component emitted in a secondary emission direction is necessary for measuring the flow on the propagation time or propagation time difference principle or Doppler principle. Because the ultrasonic signal components emitted in the direction of the first-order secondary emission directions R1.1 and R1.2 have a higher intensity compared to ultrasonic signal components emitted in higher-order secondary emission directions, it is advantageous to use for flow measurement at least one ultrasonic signal component emitted in one of the first-order secondary emission directions. The ultrasonic signal component emitted in the main emission direction R0 and reflected at an opposite measuring tube wall can be used for a sound velocity measurement.

Figure 5:
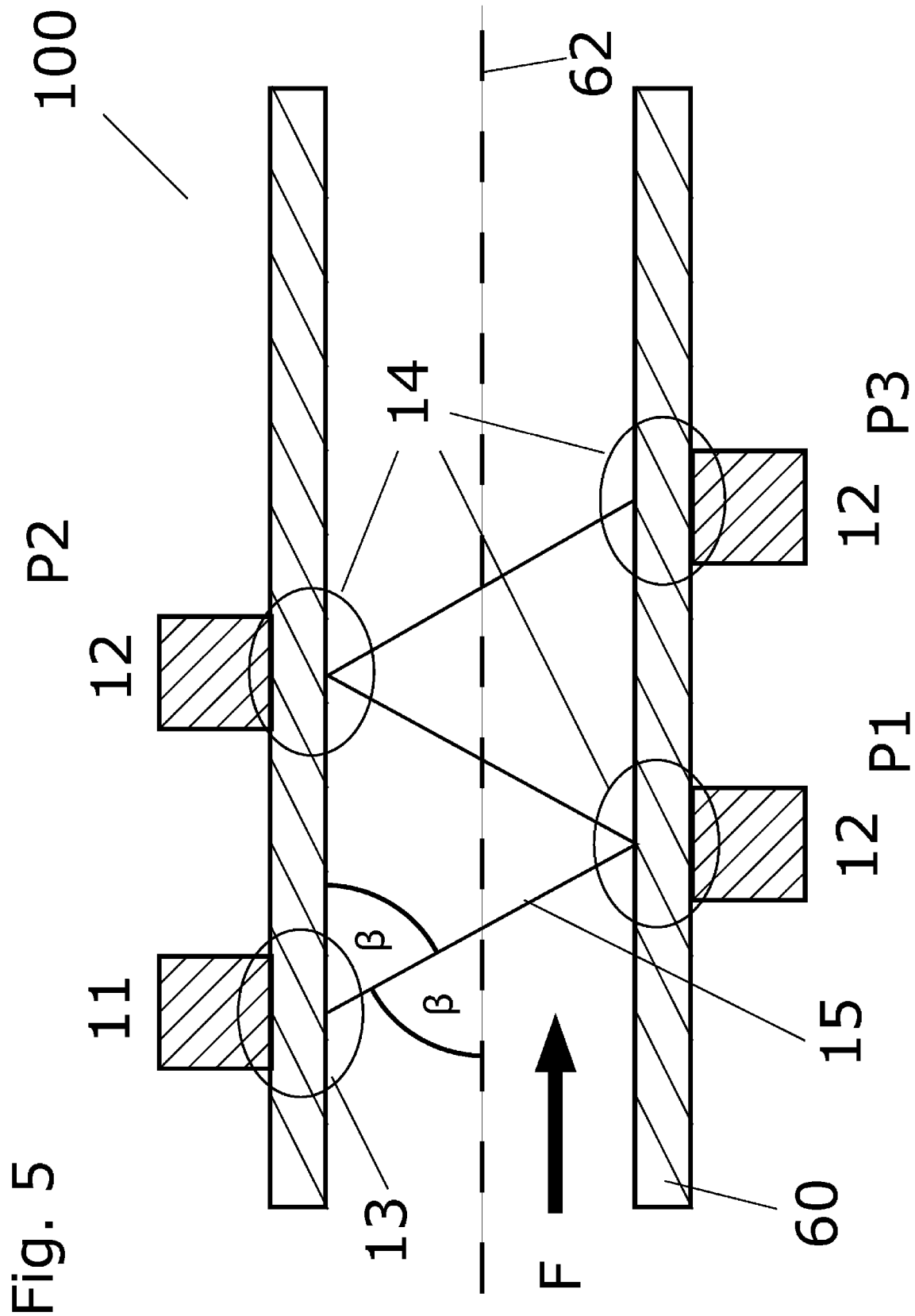
FIG. 5 shows an ultrasonic flow-rate measuring device with two clamp-on ultrasonic sensors according to the invention, which operates on the propagation time or propagation time difference principle.

FIG. 5 shows a schematic cross-section through an ultrasonic flow-rate measuring device 100 which operates on the propagation time or propagation time difference principle, with a first clamp-on ultrasonic sensor 11 according to the invention and a second clamp-on ultrasonic sensor 12 according to the invention, which can be arranged on a same measuring tube side or on a side opposite the first clamp-on ultrasonic sensor 11, wherein both positioning possibilities are illustrated in FIG. 5. The first clamp-on ultrasonic sensor is offset from the second clamp-on ultrasonic sensor 12 along a measuring tube axis, so that an ultrasonic signal running between the two clamp-on ultrasonic sensors runs with or against a flow direction of a medium flowing through the measuring tube. An ultrasonic signal generated by the transducer element of the first clamp-on ultrasonic sensor 11 excites the formation of at least one Lamb wave mode in the first region 13 of the measuring tube wall of the measuring tube 60, which results in the transmission of the ultrasonic signal into the measuring tube 60. After passing through the measuring tube along a signal path 15, the ultrasonic signal excites the formation of at least one Lamb wave mode in a second region 14 of the measuring tube wall, whereby the ultrasonic signal is picked up by the second clamp-on ultrasonic sensor 12 and directed to the transducer element 10 of the second clamp-on ultrasonic sensor. The signal path 15 of the ultrasonic signal in the measuring tube has at least one measuring tube traverse, wherein, in the case of a second ultrasonic transducer 12 arranged on the side opposite the first ultrasonic sensor 11, there is an odd number of traverses for example, at positions P1 and P3, and wherein, in the case of a second ultrasonic transducer 12 arranged on the same side as the first ultrasonic sensor 11, there is an even number of traverses, for example, at position P2. The signal path 15 does not have to be limited to three traverses; so further positions of the second ultrasonic transducer are possible.

Figure 6:
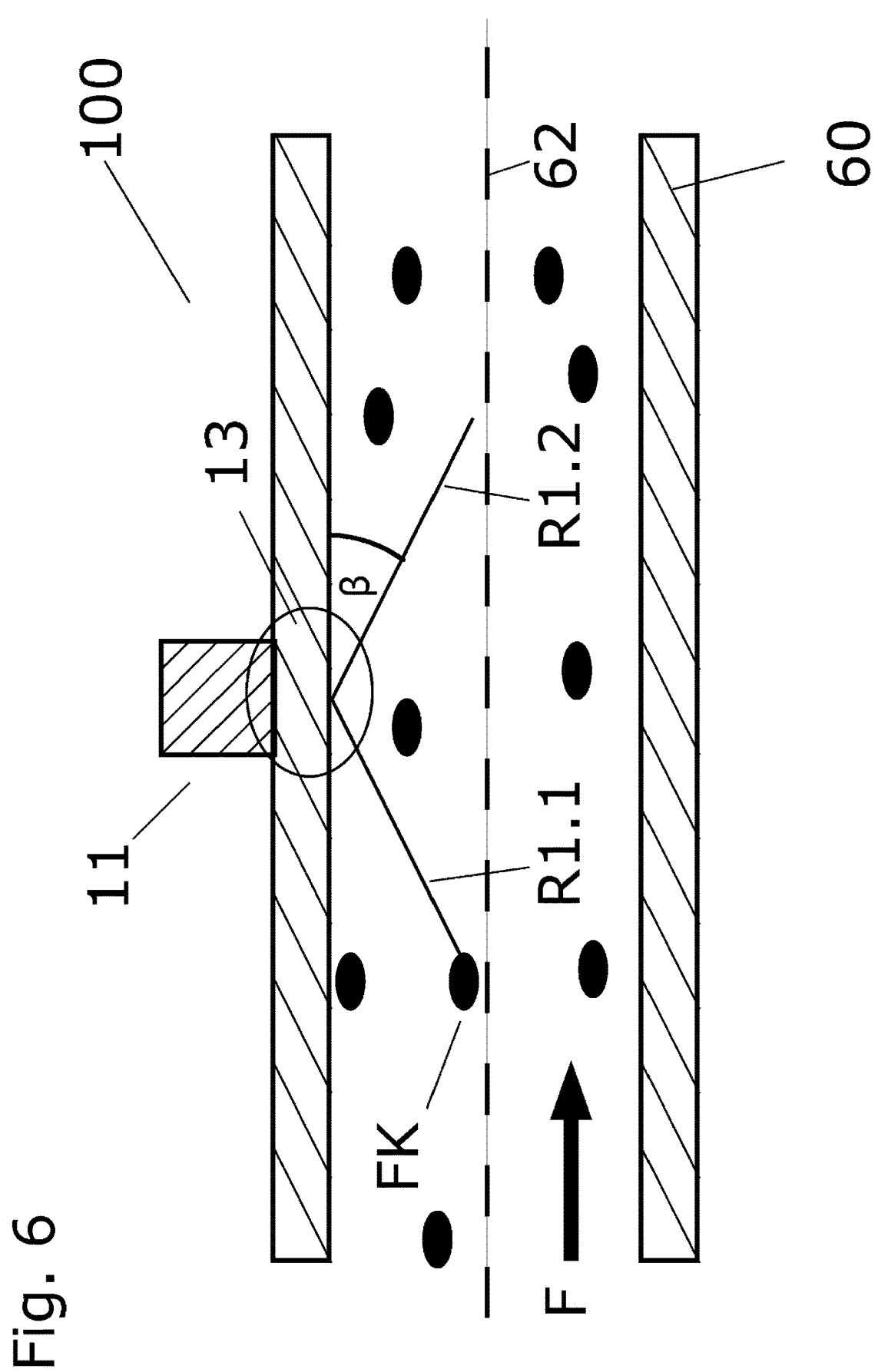
FIG. 6 shows an ultrasonic flow rate measuring device with a clamp-on ultrasonic sensor according to the invention which operates on the Doppler principle.

FIG. 6 shows a schematic cross-section through an ultrasonic flow-rate measuring device 100 operating on the Doppler principle with a first clamp-on ultrasonic sensor 11 according to the invention. An ultrasonic signal generated by the transducer element of the first clamp-on ultrasonic sensor 11 excites the formation of at least one Lamb wave mode in a first region 13 of the measuring tube wall of the measuring tube 60, resulting in the transmission of the ultrasonic signal into the measuring tube 60, wherein a first ultrasonic signal component is emitted in the secondary emission direction R1.1 and a second ultrasonic signal component is emitted in the secondary emission direction R1.2. A foreign object FK in the medium flowing through the measuring tube that is detected by the ultrasonic signal causes an ultrasonic signal reflection back into the first region 13 where it excites a renewed formation of a Lamb wave mode, whereby the reflected ultrasonic signal is absorbed by the first clamp-on ultrasonic sensor 11 and conducted to the transducer element of the first clamp-on ultrasonic sensor. Due to the flow velocity of the foreign object in the medium, the reflected ultrasonic signal experiences a flow-rate-dependent frequency shift, wherein the frequency shift is in the direction of higher frequencies in the case of a foreign object flowing toward the first clamp-on ultrasonic sensor 11, and wherein the frequency shift is in the direction of lower frequencies in the case of a foreign object flowing away from the first clamp-on ultrasonic sensor 11. An ultrasonic signal component emitted in the main emission direction R0 is not shown in the diagram.

The invention claimed is:

1. A clamp-on ultrasonic sensor for use in an ultrasonic flow-rate measuring device for measuring the flow rate or the volumetric flow rate of media in a measuring tube, the ultrasonic sensor comprising:
   a transducer element adapted to generate and/or detect ultrasonic signals; and
   an acoustic transmitter including an ultrasonic signal conductor detachably mechanically connected to a coupling element, wherein the ultrasonic signal conductor is acoustically coupled to the transducer element, and wherein the acoustic transmitter is adapted to transmit ultrasonic signals between a measuring tube wall and the transducer element such that an ultrasonic signal is formed in the measuring tube wall as at least one Lamb wave mode,
   wherein the acoustic transmitter has a geometric structure, on a side adjacent the measuring tube, configured to:
      convert an ultrasonic signal in the acoustic transmitter into an ultrasonic signal in the measuring tube wall; and/or
      convert an ultrasonic signal in the measuring tube wall into an ultrasonic signal to be detected by the acoustic transmitter, and
   wherein the coupling element includes the geometric structure and is configured to acoustically couple to the measuring tube on a side adjacent the measuring tube and, on an opposite side, to the ultrasonic signal conductor, and
   wherein the geometric structure of the coupling element includes at least two projections, wherein, in a direction of an axis of the measuring tube, adjacent projections are separate from each other by a distance, which distance is configured to enable forming the at least one Lamb wave mode in the measuring tube wall.

2. The ultrasonic sensor of claim 1, further comprising a housing defining a housing chamber in which the transducer element is arranged.

3. The ultrasonic sensor of claim 2, further comprising a holding device configured to fasten the housing or the transducer element releasably to the measuring tube.

4. The ultrasonic sensor of claim 3, wherein the coupling element can is configured to enable the coupling element to be aligned on the housing and/or on the holding device.

5. The ultrasonic sensor of claim 3, wherein the housing is configured to enable the housing to be aligned on the holding device.

6. The ultrasonic sensor of claim 3, wherein at least one element from the following list is sealed against tampering: the acoustic transmitter, the transducer element, the housing, the holding device, a clamping band, and a cable.

7. The ultrasonic sensor of claim 1, wherein the distance between the adjacent projections of the at least two projections is optimized for improving coupling properties of the coupling element with respect to a wavelength range of the ultrasonic signals and/or with respect to a geometry of the measuring tube and/or material properties of the measuring tube.

8. The ultrasonic sensor of claim 1, wherein the coupling element has a base area and a height, wherein a square of the height is less than 10% of the base area.

9. The ultrasonic sensor of claim 8, wherein the square of the height is less than 5% of the base area.

10. The ultrasonic sensor of claim 8, wherein the square of the height is less than 2% of the base area.

11. The ultrasonic sensor of claim 1, wherein a cross-section of a contact area between the geometric structure and the measuring tube defines a substantially straight line.

12. The ultrasonic sensor of claim 1, wherein a layer having an adapted transfer function for the ultrasonic signal is arranged between the coupling element and the measuring tube and/or between the coupling element and the ultrasonic signal conductor and/or between the transducer element and the ultrasonic signal conductor.

13. The ultrasonic sensor of claim 1, wherein forming the at least one Lamb wave mode in the measuring tube wall causes an ultrasonic signal to be emitted into the measuring tube, wherein the emission has at least one preferred emission direction, which emission direction forms an angle of less than 90° with respect to the measuring tube axis.

14. The ultrasonic sensor of claim 13, wherein the at least one preferred emission direction forms an angle of less than 70° with respect to the measuring tube axis.

15. The ultrasonic sensor of claim 13, wherein the at least one preferred emission direction forms an angle of less than 60° with respect to the measuring tube axis.

16. An ultrasonic flow-rate measuring device for measuring the flow rate or the volumetric flow rate of media in a measuring tube using the propagation time difference measuring principle, comprising:
   a measuring tube having a measuring tube axis;
   two clamp-on ultrasonic sensors according to claim 1, wherein the sensors are arranged on the measuring tube; and
   measuring/operating electronics configured to operate the sensors.

17. The ultrasonic flow-rate measuring device of claim 16:
   wherein a first sensor of the two sensors is arranged offset along the measuring tube axis in relation to a second sensor of the two sensors;
   wherein the first sensor and the second sensor are arranged on the measuring tube such that the at least one Lamb wave mode formed in the measuring tube wall in a first region and a second region of the measuring tube wall, respectively, causes an ultrasonic signal to be emitted into the measuring tube, wherein the emission has at least one preferred emission direction;
   wherein a first emission direction of the first region is directed to the second region, and wherein a second emission direction of the second region is directed to the first region; and
   wherein a signal path between the first region and the second region includes at least one measuring tube traverse.

18. An ultrasonic flow-rate measuring device for measuring the flow rate or the volume flow rate of media in a measuring tube using the Doppler measuring principle, comprising:
- a measuring tube having a measuring tube axis;
- a clamp-on ultrasonic sensor according to claim 1, the sensor arranged on the measuring tube; and
- measuring/operating electronics configured to operate the sensor,
- wherein the sensor is arranged on the measuring tube such that the at least one Lamb wave mode formed in the measuring tube wall causes an ultrasonic signal to be emitted into the measuring tube, wherein the emission has at least one preferred emission direction.

19. The ultrasonic sensor of claim 1, wherein the distance separating adjacent projections of the at least two projections corresponds to a distance between oscillation maxima of the at least one Lamb wave mode in the measuring tube wall or to whole-number multiples of the distance between the oscillation maxima.

\* \* \* \* \*